United States Patent
Johnsen

[15] 3,684,820
[45] Aug. 15, 1972

[54] JOINTS FOR HIGH TENSION LINES, CABLES AND THE LIKE

[72] Inventor: Leif Johnsen, Oslo, Norway

[73] Assignee: A/S Raufoss Ammunisjonsfabrikker, Raufoss, Norway

[22] Filed: Dec. 1, 1970

[21] Appl. No.: 94,097

[30] Foreign Application Priority Data

Dec. 2, 1969 Norway.....................4754/69

[52] U.S. Cl.......................174/90, 29/42 E, 29/628, 174/94 R, 339/276 E
[51] Int. Cl............................................H02g 15/08
[58] Field of Search..174/84 C, 90, 94 R; 339/276 R, 339/276 E, 275; 29/421 E, 628

[56] References Cited

UNITED STATES PATENTS

| | | | |
|---|---|---|---|
| 2,251,189 | 7/1941 | Jensen | 174/90 X |
| 3,015,685 | 1/1962 | Gerlach et al. | 174/90 |
| 3,341,650 | 9/1967 | Broske | 174/90 X |
| 2,367,206 | 1/1945 | Davis | 339/276 E UX |

*Primary Examiner*—Darrell L. Clay
*Attorney*—Waters, Roditi, Schwartz & Nissen

[57] ABSTRACT

An arrangement in detonation joining of high tension lines, cables and the like in which the core ends of the lines to be joined are connected by a steel tube compressed around same and the line ends are connected by a main connecting aluminum tube compressed around same and the steel tube. The steel tube is provided with crosssection reducing grooves or slots so adapted that a complete and safe joint can be procured by means of a single explosive charge which is placed external on the main connecting tube and during detonation causes the main connecting tube to compress around the line ends and simultaneously around the steel tube compressing same around the core ends.

4 Claims, 3 Drawing Figures

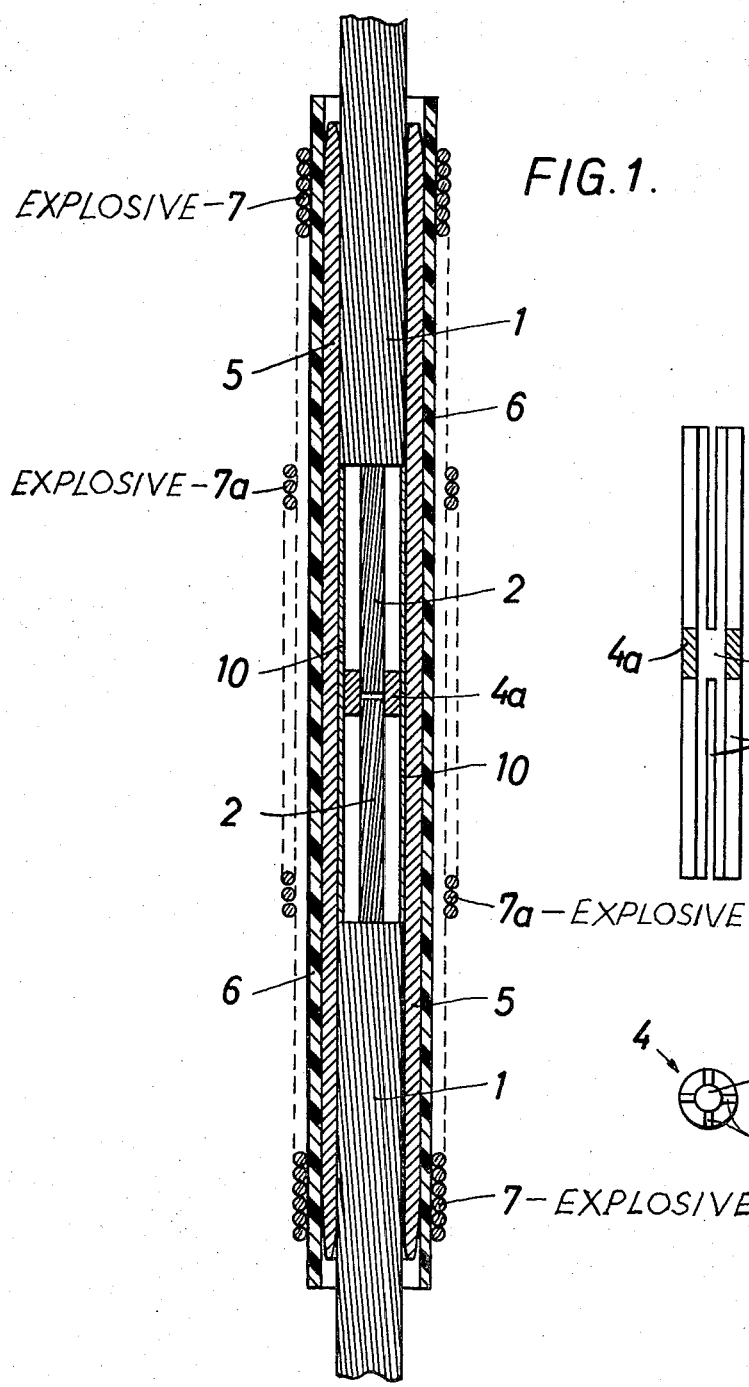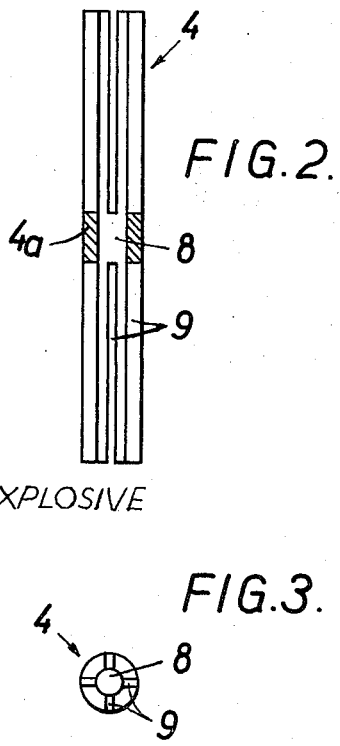

JOINTS FOR HIGH TENSION LINES, CABLES AND THE LIKE

The present invention relates to detonation joining of high tension lines, cables and the like.

More particularly the invention relates to joints for high tension lines, cables and the like in which the core ends of the lines to be joined are connected by a steel tube or sleeve compressed about the same and the line ends are connected by means of a main connecting tube of aluminum compressed around the same and said steel tube.

Joints of this kind have previously been carried out in two steps or by two detonations as the core ends of the lines are inserted into a corresponding bore of a steel connecting tube provided with an external layer of explosive which during detonation compresses said connecting tube around said core ends, whereafter the ends of the lines are connected by means of the main connecting aluminum tube which in a similar manner is compressed around said line ends and said connecting steel tube.

The above described method was found necessary due to practical difficulties in connection with adaptation of the explosive charge to the assembled joint components and the material thereof, for compression of a complete joint with certainty of a safe connection of the core ends and without damage of the components.

The present invention contemplates an arrangement which makes it possible to obtain a complete joint by a single shot or detonation and with a safe interconnection of the different components of the joint.

The invention consists in a detonation joint for high tension lines, cables and the like in which the core ends of the lines to be joined are connected by a steel tube compressed around same and the line ends are connected by a main connecting aluminum tube compressed around the same and said steel tube, characterized in that the steel tube is provided with a number of circumferentially distributed axial slots extending from each end of said tube and towards the middle thereof, so that said steel tube during detonation of an external explosive charge on the main connecting tube, having preferably a local increase in the length of the steel connecting tube, is compressed around the core ends simultaneously with the compression of said connecting tube around the line.

According to the invention this is obtained in that the steel connecting tube, connecting the cores of the line ends, is provided with a number of circumferentially distributed axial slots extending from each end of said tube and towards the middle thereof, whereby said tube during detonation of an external explosive charge on the main connecting aluminum tube, having preferably a local increase in the length of the steel connecting tube, is compressed around the core ends simultaneously with the compression of said main connecting tube around the line.

During detonation of the explosive charge the assembled joint components are subjected to an external uniform pressure impulse, whereby the main connecting tube, simultaneously with its compression around the line ends, also is compressed around said steel connecting tube partly bending and partly pinching the slotted parts thereof firmly around the core ends, and during this, material from the main connecting tube, possibly from a pressure transferring metal tube positioned between said main connecting tube and the steel tube, is extruded into the slots of the steel tube and against and between the wires of the core ends.

The invention will now be described, by way of example with reference to the accompanying drawings in which:

FIG. 1 is a longitudinal sectional view of a joint before detonation;

FIG. 2 is a longitudinal sectional view of a steel tube for connection of the core ends; and FIG. 3 is an end view of the steel tube shown in FIG. 2.

In the drawing 1 denotes the end portions of two high tension lines which are to be joined and 2 the steel core thereof.

After strapping of the line ends to expose the ends of the cores 2, said core ends are inserted into a connecting steel tube 4, to be described in greater detail later on, and an outer main connecting tube 5 of aluminum enclosing the core tube 4 and adjacent ends of the lines 1 in selected distances. In order to protect the surface of the main tube 5 there may be used, between tube 5 and the explosive charge, an intermediate layer of elastomeric damping material, such as a hose 6 of plastic, rubber or similar plastic deformable material, threaded on said tube 5. The explosive charge may consist of a detonating fuse 7 wound spirally around said hose 6 in one or more layers.

The core connecting tube 4, FIGS. 2 and 3, is made of steel and has an axial bore 8 adapted to the diameter of the ends of the cores 2 and a length corresponding to the distance between the opposite ends of the line parts 1. The cross-section of the core tube 4 is divided, by means of a number of axial slots evenly distributed around the circumference thereof, said slots extending from each end of the tube towards the middle thereof leaving a solid connecting part 4a. As will be understood, the slots may extend alternately from each end of the core tube to a short distance from the opposite end.

Due to adaptation of the dimensions of the components, it may often be convenient to place on the connecting steel tube 4 a pressure transferring tube 10 having same length as said tube 4 and an outer diameter corresponding to the inner diameter of the main tube 5; the pressure transferring tube 10 may be made from a suitable metal, such as aluminum.

In a joint of the type above described, all the components are secured to one another by compression during detonation of the explosive charge placed on the main connecting tube 5, the pressure and/or shock impulse propagating radially inwards so that the steel tube 4 is compressed evenly about the ends of the steel tube with a satisfactory "grasp" at the same time as the main connecting tube 5 is secured to and connects the ends of the lines 1 in prescribed manner.

In connection with certain requirements it may be desirable to obtain a somewhat increased pressure on the steel tube 4 and then the explosive charge on the main connecting tube 5 is locally increased. In the above described embodiment, this may be effected in that at least one layer 7a of the detonating fuse is wound spirally around the layer 7 on the main tube 5 in a length corresponding to the length of the steel tube 4 whereby during detonation of the explosive charge resulting in bending and pinching of the steel tube, material from the main connecting tube, or from the pressure transferring metal tube 10 if such one is used, is extruded into the slots of the steel tube and against and between the wires of the core ends so that a complete cavity-free joint is obtained which removes any danger of corrosion and ice-blast.

What we claim is:

1. Apparatus for forming a detonation joint for high tension lines having exposed, projecting core ends, said apparatus comprising a single steel tube for encircling the exposed core ends of the high tension lines to be joined, said steel tube having opposite ends and a plurality of circumferentially distributed axial slots extending from each of the ends of the tube towards the center thereof, said steel tube including a solid connecting part at said center with a bore in which the free ends of said core ends are received, a connecting tube surrounding said steel tube and extending beyond the ends thereof to encircle the high tension lines to be joined, a pressure transfer tube between the steel tube and the connecting tube, and explosive means encircling said connecting tube to produce, by detonation, compression of the steel tube around said core ends simultaneously with compression of said connecting tube around said lines.

2. Apparatus as claimed in claim 1 wherein said pressure transfer tube is of less rigidity than the steel tube.

3. Apparatus as claimed in claim 2 wherein said pressure transfer tube is aluminum.

4. Apparatus as claimed in claim 3 comprising a hose of resilient damping material between the explosive means and said connecting tube.

* * * * *